UNITED STATES PATENT OFFICE 2,497,968

PROCESS OF MAKING A POLYESTER

David W. Young, Roselle, and Julius P. Rocca, Linden, N. J., assignors to Standard Oil Development Company, a corporation of Delaware No Drawing. Application April 6, 1945,
Serial No. 587,022

1 Claim. (Cl. 260—410.6)

This invention relates to a novel chemical process and to the product thereof, and to special uses of said product. More particularly, it relates to a novel chemical reaction, which may be classed as an ester interchange, particularly with the aid of a special catalyst, with the resulting formation of high molecular weight linear polyesters of improved characteristics, including good oil-solubility in hydrocarbon oils, even in paraffinic lubricating oils, in which many prior art polyesters of high molecular weight have insufficient solubility for certain desired purposes.

The general chemical reaction of the type in question is already known, i. e., that raw materials containing large amounts of dicarboxylic acids, such as dimerized fatty acids, can be reacted with a glycol to make high molecular weight polyesters. However, most of such polyester products have been substantially insoluble in paraffinic lubricating oils at ordinary atmospheric temperatures, and therefore are not suited for use as additives for such oils.

One object of the present invention is to make polyesters of high solubility in paraffinic lubricating oils and to make such polyesters, when added to such oils, have superior properties of improving the viscosity index thereof and also lowering or depressing the pour point thereof, so that the resulting lubricating oil solutions will pour or flow freely at very cold temperatures and yet will not thin out excessively at the elevated temperatures generally encountered in use as automobile or airplane engine crankcase lubricants.

Broadly, the invention comprises reacting a substantially pure dimerized fatty acid or lower alkyl ester thereof with a glycol in the presence of a soluble metal soap catalyst. The invention may be illustrated by reacting a purified methyl dilinoleate with decamethylene glycol in the presence of a small amount of zinc stearate catalyst at elevated temperature.

The dimer acid raw material should contain less than about 2%, preferably less than 1%, of trimer or other higher polymers of monomeric fatty acids. In other words, this raw material should comprise essentially pure high molecular weight dicarboxylic acids such as those formed by polymerization of unsaturated monocarboxylic fatty acids, or lower alkyl esters thereof, such as methyl, ethyl, isopropyl and the like, the methyl esters being preferred. This fatty acid raw material may consist of dimerized single fatty acids or the product resulting from dimerization of a mixture of monocarboxylic acids, such as mixed dehydrated castor oil acids, mixed soybean oil acids and the like. By the term fatty acids, it is intended to include essentially only fatty acids containing more than 10 carbon atoms and preferably more than 14 carbon atoms before dimerization.

Soybean oil may be converted by methanolysis to methyl esters of the soybean oil acids by heating to 70° C. with a liberal excess of methanol in the presence of a substantial proportion of sodium methylate for several hours, distilling off the methyl esters and polymerizing them by heating to 300° C. with a suitable catalyst such as 0.3% of anthraquinone for a suitable period such as about 10 to 30 hours. The resultant product comprises essentially methyl dilinoleate esters, with a small amount of trimer esters or other high boiling products, together with some unpolymerized esters which may be removed by distillation under reduced pressure, e. g., 1 to 5 mm. The relatively pure methyl dilinoleate, i. e., the dimer fraction, may be separated from the higher boiling products by any suitable manner such as by careful fractionation in a short path pot still (a modified alembic flask) at about 2 to 50 microns, or in a cyclic molecular still at 2 to 5 microns. Substantially pure methyl dilinoleate made in this manner from soybean oil had an index of refraction of $N_D^{30}$ 1.4766.

The glycol to be used according to this invention may be one having from 2 to about 60 or so carbon atoms, but preferably has from 5 to 30 carbon atoms, a still more preferred range being from about 8 to 20 carbon atoms, such as in decamethylene glycol, octadecanediol, 12 hydroxystearol, etc. Other examples of glycols that may be used include ethylene glycol, propylene glycol, pentadiol, 2-methyl 2,4-pentadiol, or much higher molecular weight glycols such as a dimerized and hydrogenated linoleic acid or other fatty acid.

The proportions in which the dimer fatty acid, or -ester, and the glycol should be reacted, may vary somewhat, but should generally be about equimolecular proportions or, specifically, in the case of methyl dilinoleate and decamethylene glycol, the proportion should be about 3 to 1 by weight.

The catalyst to be used is preferably a zinc soap of a higher fatty acid having from about 10 to 30 carbon atoms, e. g., stearic acid, palmitic acid, etc., which soap is preferably soluble in petroleum naphtha and other such solvents. Other zinc salts and soaps may be used such as zinc naphthenate, the zinc soap of dilinoleic acid, preferably made from a trimer-free methyldilinoleate, the resulting zinc dimerate preferably having a molecular weight about 1,000. Other metal salts may be used, such as aluminum naphthenate.

Organic salts of polyvalent metals of groups II and III of the Mendeleef periodic table are preferred. The amount of catalyst to be used may vary, chiefly according to the temperature of reaction and the strength of the catalyst, but normally will range from about 0.1% to 3.0% of the total weight of reactants, and preferably about 0.3% to 1.0%. The zinc dimerate is prepared from potassium dimerate which in turn is prepared by dissolving the dimerized acids in aqueous potassium hydroxide and treated with zinc chloride to form the zinc dimerate.

The above described reaction or ester interchange may be carried out in the presence of a solvent or diluent if desired, as for instance in the presence of 1 to 5 volumes of a hydrocarbon oil such as a mineral lubricating oil base stock or a refined kerosene or naphtha, etc. per volume of mixed reactants.

The polyesterification reaction may be carried out at a suitably elevated temperature such as about 150° to 250° C., preferably about 180° to 220° C.

The reaction mixture is preferably blown with an inert gas such as nitrogen in order to assist in carrying off the water formed by the reaction.

The resulting product is a linear type polyester, of relatively high molecular weight, such as above 2,000, e. g., 5,000, 10,000, 20,000 and higher, which is soluble in hydrocarbon oils, even in paraffinic lubricating oil base stocks. This product, which generally is actually a mixture of a number of different polyester molecules of slightly different molecular weight may be fractionated if desired, by dissolving in a suitable solvent, such as a petroleum naphtha or lubricating oil base stock, and precipitating out one or more fractions by adding a small amount of non-solvent, such as a low molecular weight alcohol or acetone, etc. This polyester product is substantially free from cross-linked molecules.

The objects, advantages and details of the invention will be better understood from a consideration of the following specific examples which are given merely for the sake of illustration.

*Example 1*

A mixture of 37 gms. of 100% pure methyl ester of dilinoleic acid and 11.23 gms. of decamethylene glycol was heated with 0.5% of zinc dilinoleate at about 192° C. under nitrogen in a Flory viscometer for 5½ hours. A stream of nitrogen passed continuously through the viscometer served to stir the mixture and to facilitate removal of alcohols formed in the reaction. No air or oxygen was present in the reaction vessel at any time. The polyester product was recovered by pouring from viscometer while hot. It can also be taken up with solvent, such as a mineral oil, and filtered at room temperature to remove any insoluble catalyst.

The final product had a molecular weight of 5,350, based on viscosity tests. This condensation product is 100% readily soluble in both paraffinic and naphthenic type lubricating oils, and exhibits thickening and viscosity index improving effects, as shown by the results listed in the following table:

| Percent Polyester in Base Oil A[1] | Visc. at 100° F. | Visc. at 210° F. | V. I. |
| --- | --- | --- | --- |
| 0 | 158.2 | 44.66 | 115.9 |
| 1 | 176.2 | 46.53 | 121.0 |
| 3 | 214.8 | 50.86 | 130.0 |
| 6 | 295.3 | 59.28 | 134.8 |

[1] A paraffinic lubricating oil base stock obtained from a Barosa crude. A paraffinic type lubricating oil base stock having a viscosity at 210° F. of 43 S. U. S. and a viscosity index of 112.

The above results indicate that small additions of the polyester raised the V. I. of the lubricating oil base stock from about 115 up to 121, 130 and 134.8 respectively in concentrations of 1, 3 and 6%. For comparison, a similar experiment was made in which para toluene sulfonic acid was used as catalyst in place of the zinc stearate, but the results were very poor, showing very little catalytic reaction, because even with a reaction time of 50 hours, the polyester only had a molecular weight of 4,350 and this product when used in 5% concentration in the same Base Oil A lubricating oil base stock only increased the V. I. up to 127, which is considerably poorer than the results obtained with only 3% of the polyester produced with the zinc dilinoleate catalyst.

*Example 2*

The first experiment reported above under Example 1 was repeated, except that the reaction was carried out for a longer time, namely 12 hours, with the resulting formation of a polyester product having a molecular weight of about 6,550, which was only required in 2.8% concentration in Base Oil A lubricating oil to raise the viscosity to 51 seconds Saybolt universal at 210° F., thereby making a blend having a V. I. (viscosity index) of 132.

*Example 3*

The ester interchange reaction described in Example 1 was repeated except that 0.5% of zinc stearate was used as catalyst, with a reaction time of 24 hours. The resultant polymer had a molecular weight of about 8400 and showed the following viscosity characteristics when dissolved in the same paraffinic lubricating oil base stock used in Example 1:

| Percent Polymer in oil | SSU Visc. at 100° F. | SSU Visc. at 210° F. | V. I. |
| --- | --- | --- | --- |
| 0 | 158.2 | 44.66 | 115.9 |
| 1 | 174.4 | 46.66 | 124.0 |
| 3 | 234.6 | 53.10 | 133.1 |
| 6 | 374.2 | 68.30 | 137.0 |

*Example 4*

Example 3 was repeated except that the ester interchange reaction was carried on for 62 hours total reaction time with the result that the polymer formed had the following characteristics:

| Percent Polymer in oil | SSU Visc. at 100° F. | SSU Visc. at 210° F. | V. I. |
|---|---|---|---|
| 1 | 177.6 | 47.11 | 126.0 |
| 3 | 250.3 | 55.24 | 136.2 |
| 6 | 432.9 | 76.10 | 139.7 |

*Example 5*

Example 3 was repeated with the exception that the reaction time was carried out to a total of 96 hours, with the result that the polyester or polymer formed had a molecular weight of about 9400 and showed the following viscosity characteristics:

| Percent Polymer in oil | SSU Visc. at 100° F. | SSU Visc. at 210° F. | V. I. |
|---|---|---|---|
| 1 | 178.5 | 47.24 | 126.5 |
| 3 | 248.4 | 55.99 | 139.1 |
| 6 | 434.7 | 77.66 | 141.0 |

*Example 6*

Example 3 was repeated except that the reaction time was carried to a total of 140 hours with the resulting formation of a polyester having an average molecular weight of about 9400 which was substantially insoluble in the same paraffinic lubricating oil base stock used in Example 1. Nevertheless, this high molecular weight polyester was quite soluble in a naphthenic base oil, and when dissolved in 15% concentration in such a naphthenic oil of SAE 20 grade, the resulting concentration was found to be soluble in paraffinic lubricating oils such as the one used in Example 1. Blends were made ranging from 5 to 20% of this concentrate in a paraffinic lubricating oil base stock to which had been added 2.5% of a paraffinic Bright Stock (to make a more severe test of pour depressing characteristics), and the resulting blends showed the following pour point and viscosity characteristics:

| Per cent of Polyester Concentrate | Pour | Vis. 100° F. | Vis. 210° F. | V. I. |
|---|---|---|---|---|
| 0 | +30 | 152.6 | 43.41 | 98 |
| 5 | −10 | 176.7 | 46.7 | 121 |
| 10 | −15 | 207.9 | 49.6 | 126 |
| 20 | −35 | 297.2 | 59.2 | 134 |

The above data indicate that this polyester had both V. I. improving properties and pour depressing properties when blended into a paraffinic lubricating oil base stock by means of a small amount of naphthenic oil serving as a blending agent or mutual solvent.

*Example 7*

Another sample of the same polyester made in Example 6 was dissolved in 39% by weight concentration in a naphthenic base lube oil of SAE grade 20 and the resultant concentrate was blended into a paraffinic lubricating oil base stock similar to that used in Example 6, except that it contained 3.5% of Bright Stock instead of only 2.5%, the amount of the polyester concentrate added being sufficient to make a 2% final concentration of the polyester in the finished blend, and then this blend which had an ASTM pour point of −30° F. (compared to +30° F. for the paraffinic oil base stock) was subjected to winter field pour point tests throughout the period from November to January in two cold geographical locations in the U. S., namely at Minneapolis, Minn., and Warren, Pa. The sample of oil was observed each morning to see whether it was solid or would pour. In none of the observations (46 at Minneapolis and 27 at Warren, Pa.) were the blends containing the polyester of this invention found to be solid, whereas corresponding blends of commercially available pour depressors dissolved in the same paraffinic oil base stock were found to be solid from 7 to 12 times at Minneapolis and from 2 to 9 times at Warren, Pa., the highest solid point being +20° F. at both locations.

*Example 8*

2 methyl 2 nitro-1,3-propanediol _____gm___ 4.21
Methyl ester dimeracid _____gm___ 37.00
Zinc stearate _____per cent__ 0.5

These materials were mixed and heated for 58 hours at 192° C. and the resulting polyester had a molecular weight of about 5100. It was soluble and stable in Base Oil A, a paraffinic lube oil having a viscosity of about 43 seconds Saybolt at 210° F. and a V. I. of about 112–114 and when dissolved therein showed the following viscosity characteristics.

| Percent Polymer | 100° F. | | 210° F. | | V. I. |
|---|---|---|---|---|---|
|  | C. S. | S. S. U. | C. S. | S. S. U. |  |
| 3 | 50.6 | 234.2 | 7.57 | 50.93 | 120 |
| 6 | 67.0 | 309.6 | 10.26 | 60.13 | 133 |

*Example 9*

Iso-octyl succinic acid _____gm___ 36
Octadeconediol _____gm___ 12
Zinc stearate catalyst_____per cent__ 0.5

These materials were heated at 192° C. for 92 hours, and the resulting polyester had a molecular weight of 3900. It was insoluble in Base Oil A but soluble in a naphthenic base lube oil, and when dissolved therein showed the following viscosity characteristics:

| Percent Polymer | 100° F. | | 210° F. | | V. I. |
|---|---|---|---|---|---|
|  | C. S. | S. S. U. | C. S. | S. S. U. |  |
| 0 | 32.16 | 150.4 | 4.43 | 40.76 | 6.0 |
| 1 | 34.64 | 161.5 | 4.60 | 41.30 | 8.5 |
| 3 | 39.87 | 184.9 | 5.11 | 42.95 | 35.8 |
| 6 | 51.43 | 237.8 | 5.92 | 45.56 | 44.7 |

*Example 10*

Methyl dilinoleate _____gm___ 36.0
Octadeconediol _____gm___ 12.0
Zinc dilinoleate _____per cent__ 0.5

These materials were heated for 92 hours at 192° C., and the resulting polyester had a molecular weight of 3800. It was soluble and stable in Base Oil A, and when dissolved therein showed the following viscosity characteristics:

| Percent Polymer | 100° F. | | 210° F. | | V. I. |
|---|---|---|---|---|---|
|  | C. S. | S. S. U. | C. S. | S. S. U. |  |
| 3 | 36.78 | 171.3 | 6.11 | 46.17 | 122 |
| 6 | 48.2 | 223.1 | 7.63 | 51.13 | 127 |

Example 11

Decamethylene glycol_____gm___ 11.23
Methyl ester dimer acid_____gm___ 36.99
Zinc stearate_____per cent__ 0.5
Naphthenic base lube oil
 (S. A. E. 20)_____gm___ 100

These materials were heated at 192° C. for 30 hours, and at the end of the period the blend was thick and clear.

V. I. of resulting concentrate:

|  | Vis. at 100° F. | | Vis. at 210° F. | | V.I. |
|---|---|---|---|---|---|
|  | C. S. | S. S. U. | C. S. | S. S. U. |  |
| S. A. E. 20 | 95.3 | 440.1 | 7.71 | 51.53 | 17.5 |
| Blend (30% polymer) | 502 | 2,319 | 35.8 | 168.0 | 102.5 |

After diluted with more of same naphthenic mineral oil:

| Percent Polymer | Vis. at 100° F. | | Vis. at 210° F. | | V. I. |
|---|---|---|---|---|---|
|  | C. S. | S. S. U. | C. S. | S. S. U. |  |
| 1 | 98.5 | 455.1 | 8.02 | 52.43 | 28.0 |
| 3 | 111.8 | 516.5 | 9.10 | 56.13 | 43 |
| 6 | 199.8 | 923.1 | 11.38 | 64.12 | 54 |

The concentrate was blended in Base oil A and found to be soluble and stable, and showed the following viscosity characteristics:

| Percent Polymer | Vis. at 100° F. | | Vis. at 210° F. | | V. I. |
|---|---|---|---|---|---|
|  | C. S. | S. S. U. | C. S. | S. S. U. |  |
| 5 | 68.0 | 314.2 | 11.18 | 63.39 | 140 |
| 2.5 | 44.7 | 207.0 | 7.77 | 51.60 | 139.5 |

Example 12

Polyvinyl alcohol _____gm____ 10
Methyl ester of dimer acid _____gm____ 40
Zinc stearate _____per cent__ 0.5
Heavier naphthenic oil
 (50 sec. vis/210° F.)_____gm____ 100

These materials were heated at 192° C. for 82 hours. The solution was thick and clear and stable.

|  | Viscosity Characteristics | | | | |
|---|---|---|---|---|---|
|  | 100° F. | | 210° F. | | V. I. |
|  | C. S. | S. S. U. | C. S. | S. S. U. |  |
| Oil basestock | 66.2 | 305.9 | 6.72 | 48.14 | 38.2 |
| Concentrate (30% Polymer) | 639 | 2892 | 31.2 | 147.2 | 80.0 |

Diluted with more of same oil:

| Percent Polymer | Vis. at 100° F. | | Vis. at 210° F. | | V. I. |
|---|---|---|---|---|---|
|  | C. S. | S. S. U. | C. S. | S. S. U. |  |
| 6 | 163.3 | 754.5 | 15.35 | 79.11 | 102.9 |
| 3 | 99.7 | 460.7 | 10.40 | 60.62 | 93.4 |

It is not intended that this invention be limited to the specific examples which have been given merely for the sake of illustration but only by the appended claim in which it is intended to claim all novelty inherent in the invention as well as all modifications coming within the scope and spirit of the invention.

What is claimed is:

The process which comprises reacting a substantially pure methyl dilinoleate with decamethylene glycol in the presence of about 0.3 to 1.0% of zinc dilinoleate having a molecular weight of about 1,000, at a temperature of about 180° C. to 220° C. for a sufficient reaction time to produce a high molecular weight polyester.

DAVID W. YOUNG.
JULIUS P. ROCCA.

REFERENCES CITED

The following references are of record in the file of this patent:

UNITED STATES PATENTS

| Number | Name | Date |
|---|---|---|
| 2,342,113 | Blair | Feb. 22, 1944 |
| 2,360,393 | Burrell | Oct. 17, 1944 |
| 2,360,394 | Burrell | Oct. 17, 1944 |
| 2,373,015 | Cowan et al. | Apr. 3, 1945 |
| 2,375,516 | Blair | May 8, 1945 |
| 2,397,602 | Gresham | Apr. 2, 1946 |
| 2,416,433 | Brown | Feb. 25, 1947 |
| 2,429,219 | Cowan et al. | Oct. 21, 1947 |